(12) United States Patent
Suyama et al.

(10) Patent No.: US 9,037,289 B2
(45) Date of Patent: May 19, 2015

(54) PROCESSING SYSTEM, ROBOT, AND PRODUCT MANUFACTURING METHOD

(75) Inventors: Takashi Suyama, Fukuoka (JP); Junichi Imatome, Fukuoka (JP); Toru Kajiwara, Fukuoka (JP); Yoshiaki Yamamoto, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 663 days.

(21) Appl. No.: 13/252,353

(22) Filed: Oct. 4, 2011

(65) Prior Publication Data

US 2012/0083920 A1 Apr. 5, 2012

(30) Foreign Application Priority Data

Oct. 4, 2010 (JP) .............................. P.2010-224498

(51) Int. Cl.
*G06F 7/00* (2006.01)
*B65B 5/10* (2006.01)
*B25J 9/00* (2006.01)
*B65B 5/08* (2006.01)
*B65B 35/18* (2006.01)
*B65B 43/46* (2006.01)
*B65B 55/20* (2006.01)

(52) U.S. Cl.
CPC .............. *B65B 5/105* (2013.01); *B25J 9/0084* (2013.01); *B25J 9/0087* (2013.01); *B25J 9/0093* (2013.01); *B65B 5/08* (2013.01); *B65B 35/18* (2013.01); *B65B 43/46* (2013.01); *B65B 55/20* (2013.01)

(58) Field of Classification Search
CPC ........ B65G 43/08; B65G 43/09; B65G 43/10; B65G 37/02
USPC .......................................................... 700/230
See application file for complete search history.

(56) References Cited

U.S. PATENT DOCUMENTS 5,655,355 A * 8/1997 Ramler .......................... 53/475
5,857,311 A 1/1999 Focke et al.
(Continued)

FOREIGN PATENT DOCUMENTS

DE   10129226    1/2003
EP   0959002     11/1999
JP   63-012421   1/1988
(Continued)

OTHER PUBLICATIONS

Japanese Office Action for corresponding JP Application No. 2010-224498, Nov. 19, 2013.
(Continued)

*Primary Examiner* — Gene Crawford
*Assistant Examiner* — Kyle Logan
(74) *Attorney, Agent, or Firm* — Mori & Ward, LLP (57) ABSTRACT

A processing system according to embodiments has an article supplier which supplies an article; a first conveyor which conveys an object to be processed; a workbench which is provided on the downstream side of the first conveyor and places thereon the object to be processed, conveyed by the first conveyor; a robot which takes out the article from the article supplier and subjects the object to be processed, placed on the workbench, to an operation using the article according to a previously instructed operation movement; and a second conveyor which is provided on the downstream side of the workbench and conveys the object to be processed, which has been subjected to the operation by the robot.

13 Claims, 10 Drawing Sheets

(56) References Cited

U.S. PATENT DOCUMENTS

| | | | |
|---|---|---|---|
| 2010/0234982 A1* | 9/2010 | Sankaran et al. | 700/216 |
| 2013/0291998 A1* | 11/2013 | Konnerth | 141/1 |

FOREIGN PATENT DOCUMENTS

| | | |
|---|---|---|
| JP | 09-057550 | 3/1997 |
| JP | 11-130023 | 5/1999 |
| JP | 2004-179530 | 6/2004 |
| JP | 2004-189293 | 7/2004 |
| JP | 2009-000799 | 1/2009 |
| JP | 2010-099755 | 5/2010 |
| WO | 2009/146117 | 12/2009 |

OTHER PUBLICATIONS

Extended European Search Report for corresponding EP Application No. 11183756.3-2308, Dec. 28, 2011.

Chinese Office Action for corresponding CN Application No. 201110301823.4, Oct. 25, 2013.

Chinese Office Action for corresponding CN Application No. 201110301823.4, Jun. 19, 2014.

\* cited by examiner

PROCESSING SYSTEM, ROBOT, AND PRODUCT MANUFACTURING METHOD

CROSS-REFERENCE TO RELATED APPLICATIONS

The present application claims priority under 35 U.S.C. §119 to Japanese Patent Application No. 2010-224498, filed on Oct. 4, 2010. The contents of this application are incorporated herein by reference in their entirety.

BACKGROUND OF THE INVENTION

1. Field of the Invention

Embodiments disclosed herein relate to a robot, a processing system, and a product manufacturing method.

2. Discussion of the Background

JP-A-No. 2009-000799 discloses a technique for automating a production line by allowing a robot to perform a manual operation.

In addition to the technique described in such a document, there has been increased demand for making production facilities efficient by automating various complicated manual operations using robots having high general versatility, not dedicated machines. Therefore, operations which can be automated using robots are required to be expanded.

SUMMARY OF THE INVENTION

A processing system according to a first aspect of the present invention includes an article supplier which supplies an article; a first conveyor which conveys an object to be processed; a workbench which is provided on the downstream side of the first conveyor and places thereon the object to be processed, conveyed by the first conveyor; a robot which takes out the article from the article supplier and subjects the object to be processed, placed on the workbench, to an operation using the article according to a previously instructed operation movement; and a second conveyor which is provided on the downstream side of the workbench and conveys the object to be processed, which has been subjected to the operation by the robot.

BRIEF DESCRIPTION OF THE DRAWINGS

More thorough recognition and advantages therewith of the present invention will be easily understood by reading the following detailed description of the invention with reference to the drawings.

DESCRIPTION OF THE EMBODIMENTS

Embodiments will be described with reference to the accompanying drawings. Illustrations of parts which are not associated with the description in the drawings can be omitted.

Figure 1:
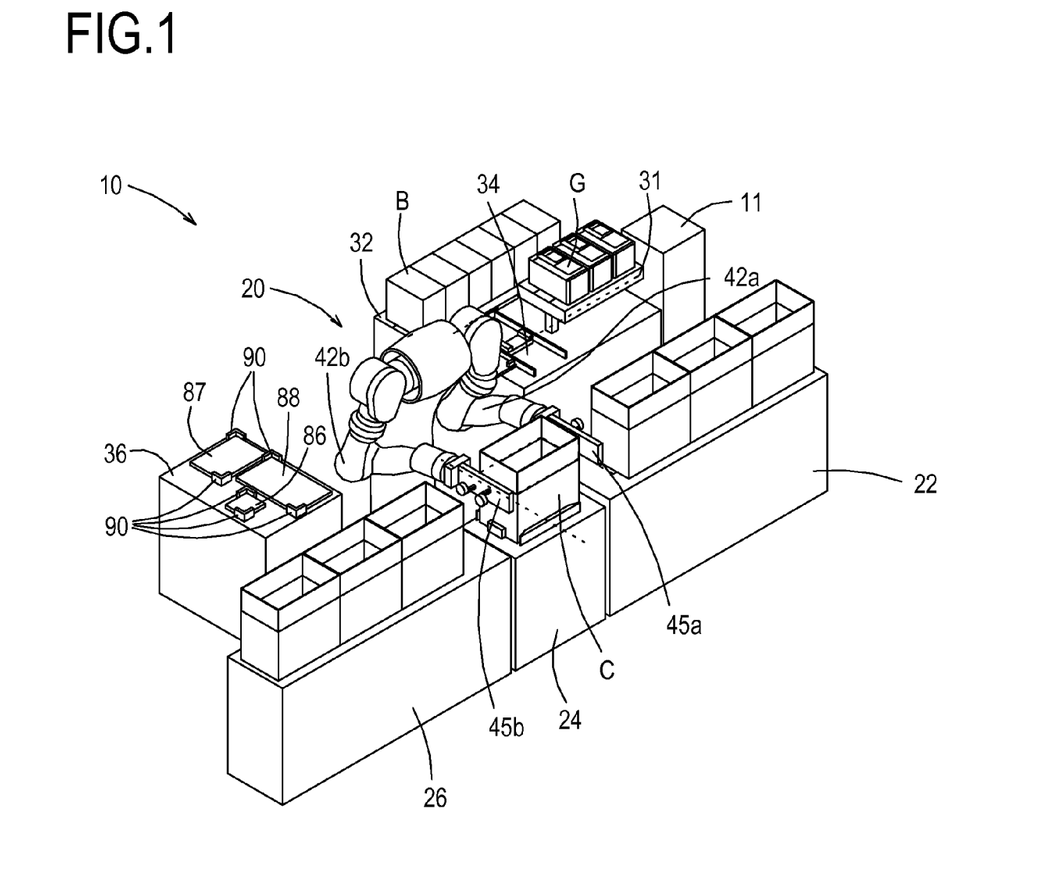
FIG. 1 is a perspective view of a packing system according to a first embodiment.
Figure 2:
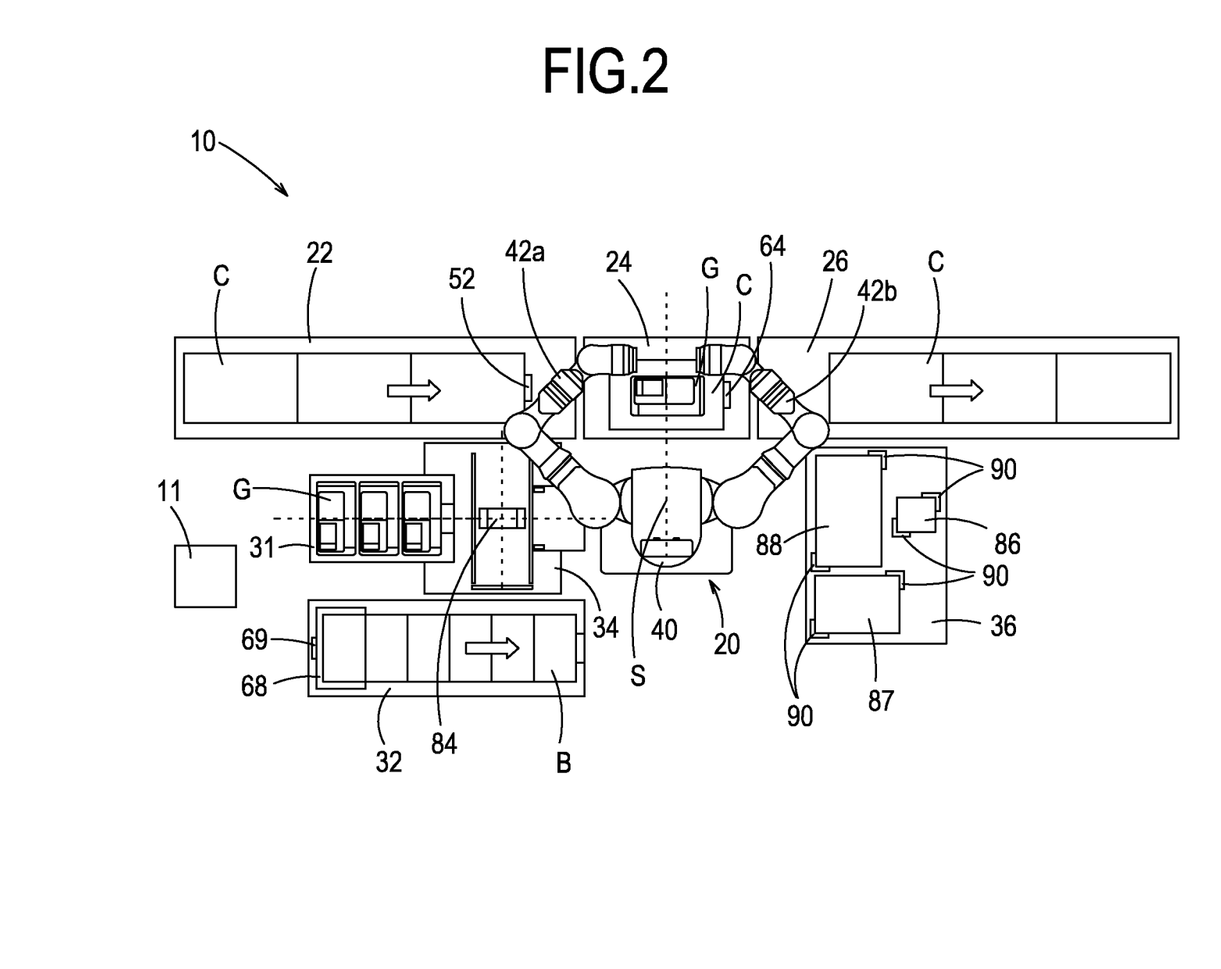
FIG. 2 is a plan view of the packing system according to the first embodiment.

As shown in FIGS. 1 and 2, a packing system 10 according to a first embodiment is an example of a processing system, and is a system which performs, as an example of an operation, a packing operation of packing an inverter (an example of an article) G, a buffer material B, and accessories into a corrugated box (an example of a packing case) C which is an object to be processed.

The packing system 10 includes a double-armed robot (an example of a robot) 20, a conveying-in conveyor (an example of a first conveyor) 22, a workbench 24, and a conveying-out conveyor (an example of a second conveyor) 26. Further, the packing system 10 includes a first gravity conveyor (an example of an article supplier) 31, a second gravity conveyor (an example of a buffer material supplier) 32, an auxiliary workbench 34, and an accessory supply table 36. The operation of the packing system 10 is controlled by a system controller 11, as a host controller, having a storage device, an arithmetic device, a display device, and an input device.

The double-armed robot 20 can attach the buffer material B to the inverter G, and can pack these into the corrugated box C.

The double-armed robot 20 has a body 40 which can be turned about a turning axis S crossing the installation surface, and a first arm 42a and a second arm 42b respectively provided on the left and right sides of the body 40. The first arm 42a is operated as the left arm of the double-armed robot 20, and has a distal end provided with a first hand 45a (see FIG. 4). The second arm 42b is operated as the right arm of the double-armed robot 20, and has a distal end provided with a second hand 45b (see FIG. 5). Each of the first arm 42a and the second arm 42b is a seven-axis joint robot. Although the double-armed robot 20 according to this embodiment is one robot as a whole, it can also be assumed as two robots provided on the body (turning base).

Figure 4:
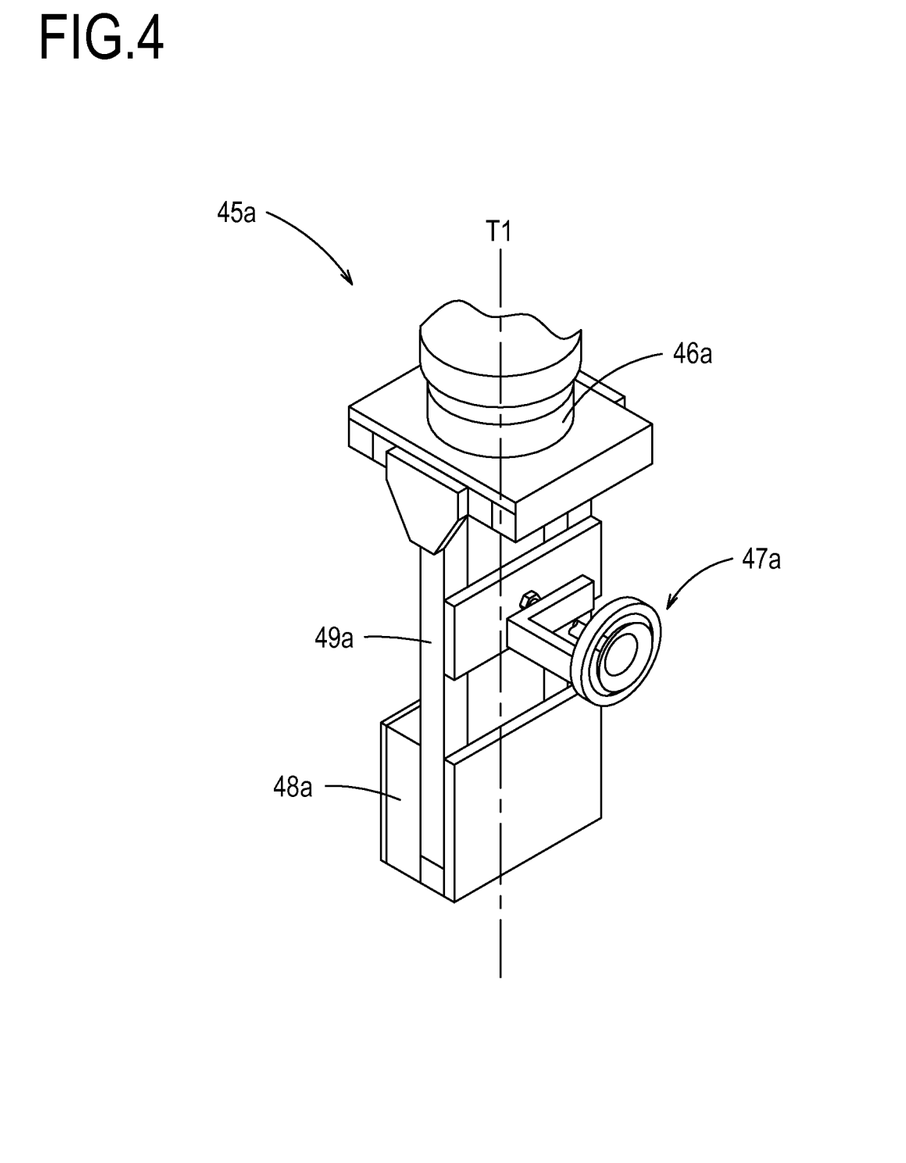
FIG. 4 is a perspective view showing a first hand of a robot that the packing system has.

As shown in FIG. 4, the first hand 45a is attached to a first wrist flange 46a provided at the distal end of the first arm 42a, and can be rotated about a rotational axis T1 of the first wrist flange 46a. The first hand 45a is provided with a first suction pad 47a and a first pad (an example of a first contacting member) 48a.

The first suction pad 47a is provided on one side of a first frame 49a which is plate-shaped and extends in the rotational axis T1 direction, and can suck the buffer material B and the accessories by air.

The first pad 48a is provided on the other side of the first frame 49a, and is brought into contact with the corrugated box C, the buffer material B, and the inverter G. The first pad 48a is, e.g., a rectangular parallelepiped resilient member.

Figure 5:
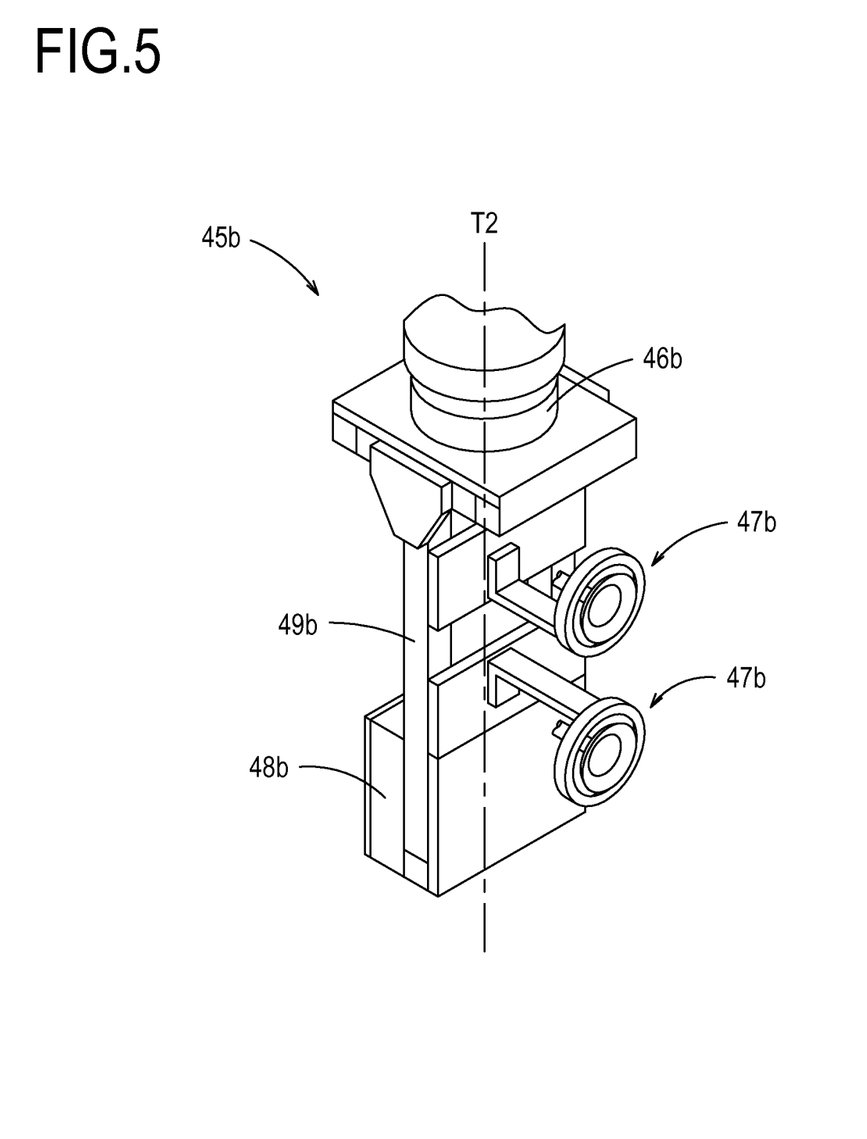
FIG. 5 is a perspective view showing a second hand of a robot that the packing system has.

As shown in FIG. 5, the second hand 45b provided at the distal end of the second arm 42b is attached to a second wrist flange 46b provided at the distal end of the second arm 42b, and can be rotated about a rotational axis T2 of the second wrist flange 46b. The second hand 45b is provided with two second suction pads 47b and a second pad (an example of a second contacting member) 48b.

The second suction pads 47b are provided on one side of a second frame 49b which is plate-shaped and extend in the rotational axis T2 direction, and can suck the buffer material B and the accessories by air.

The second pad 48b is provided on the other side of the second frame 49b, and is brought into contact with the corrugated box C, the buffer material B, and the inverter G. The second pad 48b is, e.g., a rectangular parallelepiped resilient member.

The double-armed robot 20 is controlled by a robot controller, not shown, and is operated according to a previously instructed operation.

The conveying-in conveyor 22 is driven by a motor, not shown, and can convey the corrugated box C from the upstream to the downstream (see the arrow shown in FIG. 2). As shown in FIGS. 1 and 2, the conveying-in conveyor 22 is arranged leftward and forward of the double-armed robot 20. A stopper 52 which can be advanced upward from the conveying surface is provided at the downstream end of the conveying-in conveyor 22. By the advance of the stopper 52, the corrugated box C located at the downstream end can be stopped in a predetermined position.

The workbench 24 is a workbench on which the double-armed robot 20 performs the packing operation. As shown in FIGS. 1 and 2, the workbench 24 is arranged forward of the body 40 of the double-armed robot 20. In addition, the workbench 24 is installed on the downstream side of the conveying-in conveyor 22 so as to be located at substantially the same height as the conveying surface of the conveying-in conveyor 22.

Figure 6:
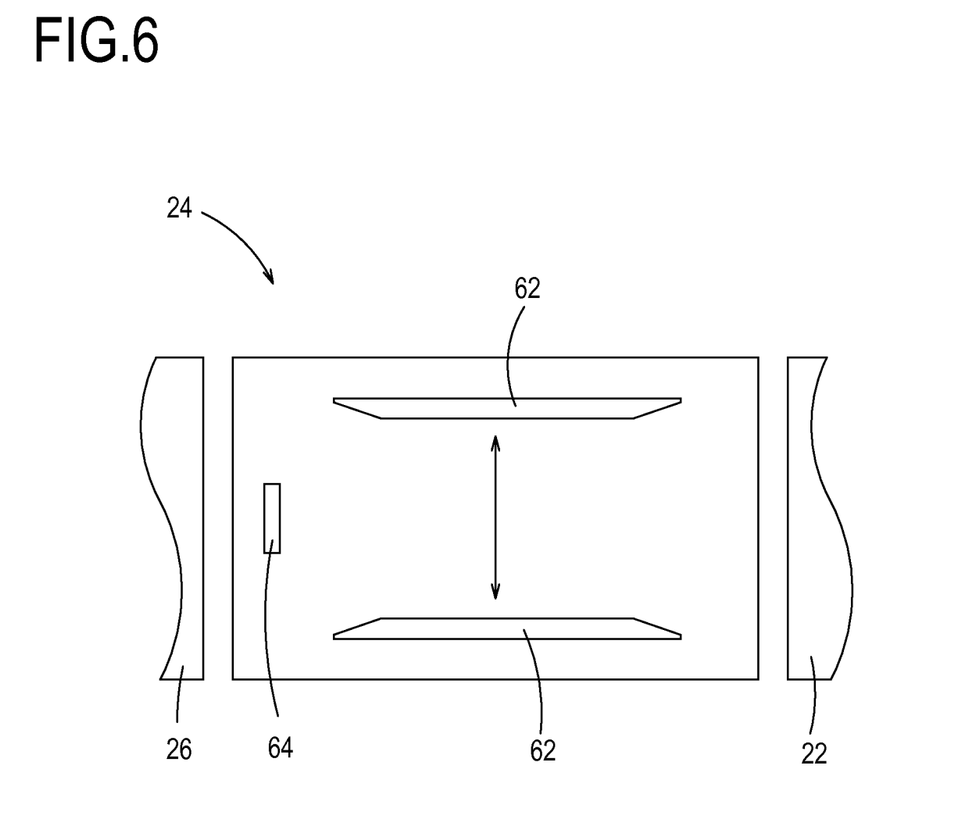
FIG. 6 is an explanatory view showing a workbench that the packing system has.

As shown in FIG. 6, a pair of holding members 62 and a stopper 64 are provided on the workbench 24.

The pair of holding members 62 are projected from the top of the workbench 24, and are parallel with each other with spacing along the conveying direction of the conveying-in conveyor 22. As indicated by the double-headed arrow in FIG. 6, the pair of holding members 62 can be moved in the direction crossing the conveying direction of the conveying-in conveyor 22 (that is, can adjust the interval between the pair of holding members 62), and can hold the lower side surfaces of the corrugated box C located between the holding members.

The stopper 64 is provided so as to be advanceable upward from the top of the workbench, and can position the corrugated box C by being brought into contact with one side surface of the corrugated box C (see FIG. 1).

The conveying-out conveyor 26 can convey the corrugated box C into which the inverter G is packed, from the upstream to the downstream (see the arrow shown in FIG. 2). As shown in FIGS. 1 and 2, the conveying-out conveyor 26 is arranged rightward and forward of the double-armed robot 20. The conveying-out conveyor 26 is installed on the downstream side of the workbench 24 so that the conveying surface is located at substantially the same height as the workbench 24.

The first gravity conveyor 31 can supply the inverter G to be packed, to the double-armed robot 20. As shown in FIGS. 1 and 2, the first gravity conveyor 31 is arranged on the left side of the double-armed robot 20. In the first gravity conveyor 31, the downstream side in the conveying direction is lower than the upstream side and the conveying surface is inclined.

The second gravity conveyor 32 can supply the buffer material B to the double-armed robot 20. As shown in FIGS. 1 and 2, the second gravity conveyor 32 is arranged leftward and rearward of the double-armed robot 20. In the second gravity conveyor 32, the downstream side in the conveying direction is lower than the upstream side and the conveying surface is inclined.

Figure 8:
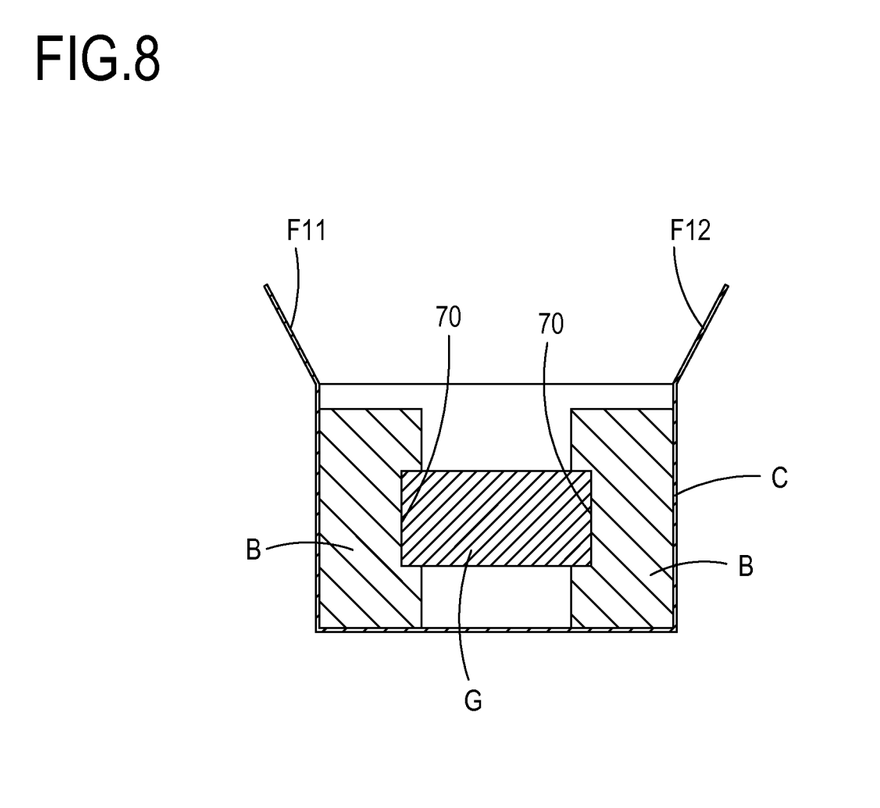
FIG. 8 is an explanatory view showing an inverter packed into the corrugated box handled by the packing system.

Here, the buffer material B will be described. As shown in FIG. 8, the buffer material B is a corrugated cardboard member which is accommodated into a space caused between the inverter G and the corrugated box C. A hole portion 70 which is rectangular in front view and corresponds to the shape of each end of the inverter G is formed with respect to the center portion of one side of the buffer material B, so that the buffer material B is attached to each end of the inverter G. The buffer material B which is attached to the inverter G is packed into the corrugated box C.

Figure 7:
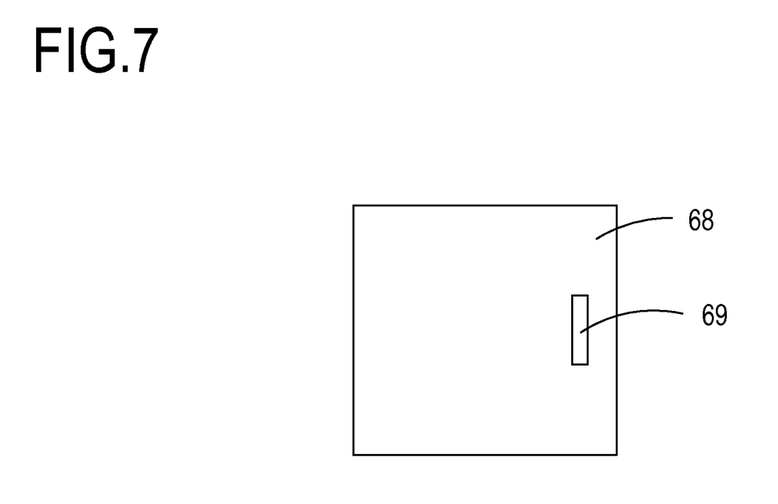
FIG. 7 is a plan view showing a weight added to a buffer material handled by the packing system.

The second gravity conveyor 32 can convey an article to be conveyed from the upstream side to the downstream side by the gravity of the article to be conveyed. However, when the article to be conveyed is the corrugated cardboard buffer material B like this embodiment, conveying can be stopped since the buffer material B is lightweight. Accordingly, in this embodiment, a weight is added to the buffer material B. Specifically, the buffer material B on the upstream side following the buffer material B located on the downstream side is placed on a metal weight plate 68 as shown in FIG. 7. A projecting portion 69 which is brought into contact with the side surface on the upstream side of the buffer material B is provided on the upper surface of the weight plate 68.

Figure 9:
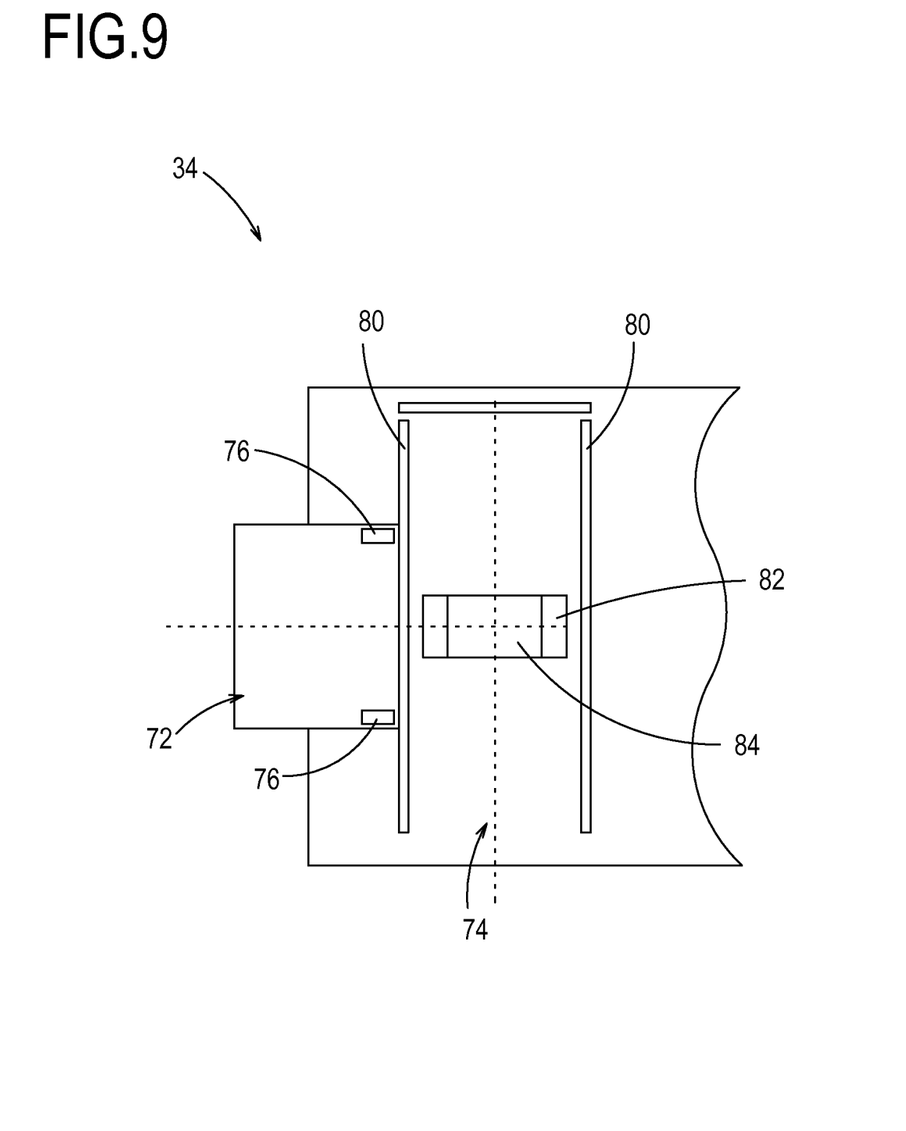
FIG. 9 is an explanatory view showing an auxiliary workbench provided in the packing system.

The auxiliary workbench 34 is a workbench on which the double-armed robot 20 performs an operation of attaching the buffer material B to the inverter G. As shown in FIGS. 1 and 2, the auxiliary workbench 34 is arranged on the left side of the double-armed robot 20 and on the front side from the first gravity conveyor 31 as seen from the double-armed robot 20. As shown in FIG. 9, the auxiliary workbench 34 has a temporary placer 72 and an assembler 74.

The temporary placer 72 is a portion on which the double-armed robot 20 temporarily places the buffer material B taken out from the second gravity conveyor 32. A pair of positioning members 76 for positioning the buffer material are provided on the temporary placer 72 so as to be projected from the top of the auxiliary workbench 34. The upper corners of the opposite surfaces of the pair of positioning members 76 are chamfered.

The assembler 74 is a portion in which the double-armed robot 20 attaches two buffer materials B to the inverter G. The assembler 74 is provided with a pair of guiding members 80 and a supporting member 82 which positions the inverter G.

The pair of guiding members 80 are projected from the top of the auxiliary workbench 34 and are parallel with each other with spacing along the direction crossing the conveying direction of the conveying-in conveyor 22. This spacing is longer than the length of the buffer material B. The upper corners of the opposite surfaces of the pair of guiding members 80 are chamfered.

The supporting member 82 is provided between the pair of guiding members 80 and is formed with a hollow portion 84 in the center portion in the direction in which the guiding members 80 are opposite. The inverter G is placed with respect to the hollow portion 84 and is supported so as to be lifted from the auxiliary workbench 34 by a predetermined height.

Figure 3:
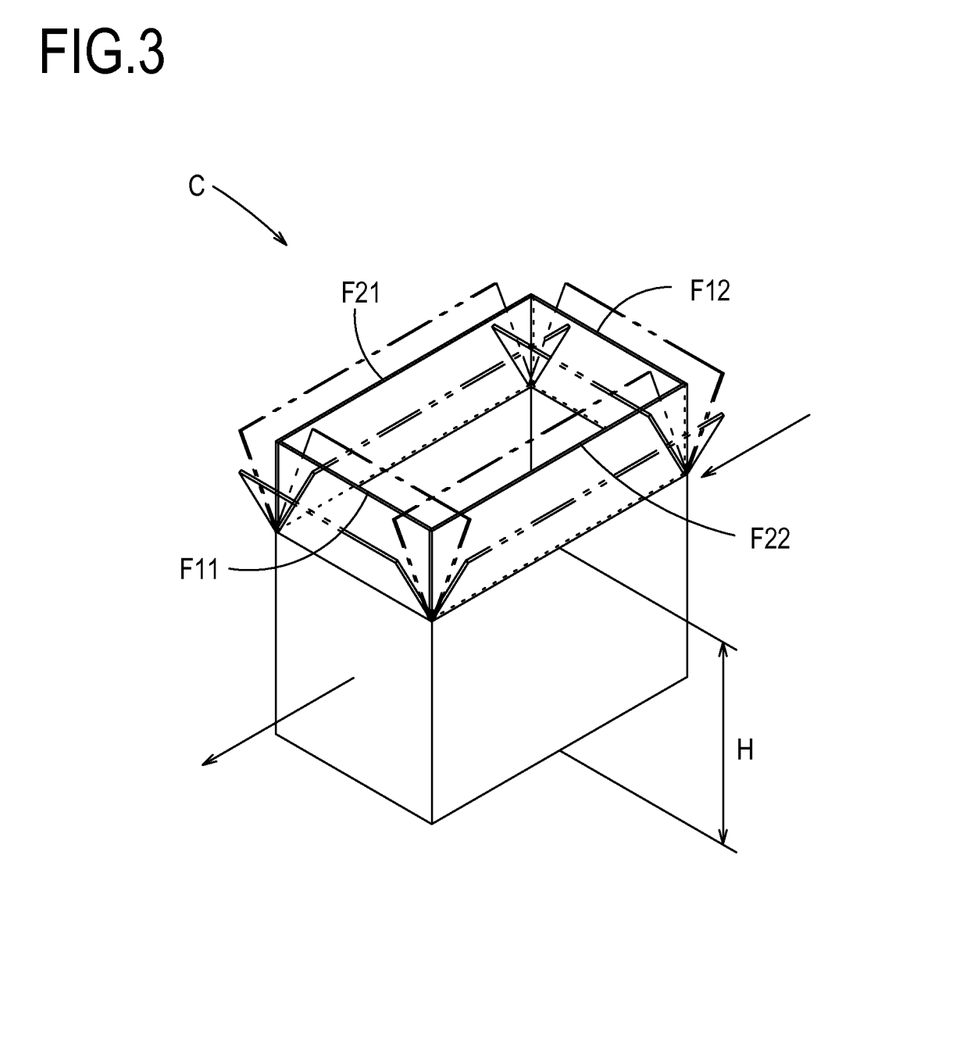
FIG. 3 is an explanatory view showing a corrugated box handled by the packing system.

The accessory supply table 36 is a table on which accessories such as a software CD 86 of the inverter G and a manual 87 of the inverter G packed in a vinyl package, and an intermediate sheet 88 can be placed. Here, the intermediate sheet 88 is a corrugated cardboard member which is inserted between the inverter G to which the buffer material B is attached and flaps F11, F12, F21, and F22 (see FIG. 3) of the corrugated box C, and closes the opening of the corrugated box C. As shown in FIGS. 1 and 2, the accessory supply table 36 is arranged on the right side as seen from the double-armed robot 20. The accessories and the intermediate sheet 88 are positioned on the accessory supply table 36 by positioning members 90.

Next, the packing operation (packing method) by the packing system 10 according to the first embodiment will be described. Further, the packing operation can also be assumed as a product manufacturing method of manufacturing a processed object in which the empty corrugated box C is subjected to arrangement processing of the article (inverter G).

The packing operation is largely divided into steps S1 to S4. Step S1 is a step in which the double-armed robot 20 moves the empty corrugated box C from the conveying-in conveyor 22 to the workbench 24. Step S2 is a step in which the double-armed robot 20 takes out the inverter G and the buffer material B from the first gravity conveyor 31 and the second gravity conveyor 32, and attaches the buffer material B to the inverter G on the auxiliary workbench 34. Step S3 is a step in which the double-armed robot 20 packs the inverter G to which the buffer material B is attached, into the corrugated box C, and also packs the accessories and the intermediate sheet 88 thereinto. Step S4 is a step in which the double-armed robot 20 moves the corrugated box C (packing body) into which the contents are packed, to the conveying-out conveyor 26. Hereinafter, steps 1 to 4 will be described sequentially.

(Step S1-1)

The conveying-in conveyor 22 conveys the empty corrugated box C from the upstream side to the downstream side. The corrugated box C to be conveyed is brought into contact with the stopper 52 (see FIG. 2) which is advanced from the conveying surface. As a result, the empty corrugated box C is stopped at the end on the downstream side. In principle, the flaps F11, F12, F21, and F22 of the corrugated box C are erected upward. Thereafter, the conveying-in conveyor 22 is stopped to retreat and release the stopper 52.

(Step S1-2)

The double-armed robot 20 inserts the first hand 45a into the corrugated box C. Here, as indicated by the alternate long and two short dashes lines in FIG. 3, the flaps F11, F12, F21, and F22 of the corrugated box C can be inclined to the inside or outside of the corrugated box C. Accordingly, when inserting the first hand 45a into the corrugated box C, the double-armed robot 20 moves the first hand 45a with the trajectory from the upper side toward the lower side near the center of the opening of the corrugated box C so as to prevent the inside-inclined flaps F11, F12, F21, and F22 or to at least prevent the first hand 45a from inclining the flaps F11, F12, F21, and F22 to the inside.

The double-armed robot 20 abuts the first pad 48a of the first hand 45a onto the inner side surface on the downstream side in the conveying direction of the corrugated box C (the inner side surface on the lower side of the flap F11), and draws the corrugated box C in the conveying direction of the conveying-in conveyor 22 until only the end on the upstream side in the conveying direction of the corrugated box C is placed on the conveying-in conveyor 22. As described above, the workbench 24 is installed at substantially the same height as the conveying surface of the conveying-in conveyor 22. Therefore, when the double-armed robot 20 uses the first hand 45a to draw the corrugated box C, the corrugated box C is moved from the conveying-in conveyor 22 to the workbench 24. In this way, since in the packing system 10, the double-armed robot 20 itself moves the corrugated box C, any different mechanism for moving the corrugated box C from the conveying-in conveyor 22 to the workbench 24 at the timing according to the operation of the double-armed robot 20 is not necessary.

Thereafter, the pair of holding members 62 of the workbench 24 hold the corrugated box C. To prevent the flap on the downstream side in the conveying direction (the inner flap F11 on the downstream side) from being inclined to the inside, the double-armed robot 20 moves the first hand 45a (the first pad 48a) inserted into the corrugated box C to the position in which the inner flap F11 on the downstream side can be supported from the inside.

(Step S1-3)

The double-armed robot 20 uses the second pad 48b of the second hand 45b to fold the inner flap F11 on the downstream side to the outside. The double-armed robot 20 moves the first hand 45a to the inside of the flap on the upstream side in the conveying direction (the inner flap F12 on the upstream side), and uses the first pad 48a to fold the inner flap F12 on the upstream side to the outside. Subsequently, the double-armed robot 20 uses the second pad 48b and the first pad 48a to fold the flap on the front side of the double-armed robot 20 (the outer flap F21 on the front side) and the flap on the rear side (the outer flap F22 on the rear side) to the outside.

(Step S1-4)

The double-armed robot 20 is turned about 90° to the left. The holding members 62 of the workbench 24 release the corrugated box C. The double-armed robot 20 uses the second pad 48b to push the side surface on the upstream side of the corrugated box C from the outside, and abuts the corrugated box C onto the stopper 64 advanced from the workbench 24. The holding members 62 hold the corrugated box C again. The double-armed robot 20 performs an operation of moving the second hand 45b so as to open the inner flap F12 on the upstream side to the outside.

(Step S2-1)

Subsequently, the double-armed robot 20 uses the first suction pad 47a to take out the buffer material B from the second gravity conveyor 32. Specifically, the double-armed robot 20 sucks the upper surface of the buffer material B on the downmost stream side by the first suction pad 47a, and pushes the sucked buffer material B toward the upstream side in the conveying direction once to lift and take out the buffer material B. As a result, a plurality of buffer materials B following the sucked buffer material B are moved to the upstream side once, and are then moved to the downstream side by the gravity, respectively. In this way, the plurality of buffer materials B following the buffer material B sucked by the double-armed robot 20 are moved to the upstream side once, so that the buffer material B can be prevented from stopping midway through the second gravity conveyor 32.

Since the buffer material B to be sucked is stopped midway through the second gravity conveyor 32 due to some cause and has not reached the downstream end, the double-armed robot 20 can fail to suck the buffer material B. Therefore, when the double-armed robot 20 fails to suck the buffer material B, the distal end of the first arm 42a is moved from the downstream side to the upstream side of the second gravity conveyor 32, and attempts to bring the distal end of the first arm 42a into contact with the stopped buffer material B. The distal end of the first arm 42a is brought into contact with the stopped buffer material B to apply a shock thereto, so that the possibility that the buffer material B may be conveyed to the downstream side can be increased.

The buffer material B sucked and taken out by the double-armed robot 20 is temporarily placed on the temporary placer 72 of the auxiliary workbench 34 so as to be accommodated between the pair of positioning members 76. The double-armed robot 20 uses the second pad 48b of the second hand 45b to push the buffer material B which is temporarily placed on the temporary placer 72, and abuts the buffer material B onto the guiding member 80 on the front side as seen from the double-armed robot 20. Thereby, the buffer material B is positioned in a predetermined position of the temporary placer 72.

(Step S2-2)

The double-armed robot 20 uses the first hand 45a and the second hand 45b to take out the inverter G from the first gravity conveyor 31. Specifically, the double-armed robot 20 brings the first pad 48a and the second pad 48b into contact with both end faces of the inverter G to hold the inverter G, and pushes the held inverter G toward the upstream side in the conveying direction once to take out the inverter G. As a result, a plurality of inverters G following the taken-out inverter G are moved to the upstream side once, and are then moved to the downstream side by the gravity, respectively. In this way, the plurality of inverters G following the inverter G taken out by the double-armed robot 20 are moved to the upstream side once, so that the inverter G can be prevented from being stopped midway through the first gravity conveyor 31.

The double-armed robot 20 places the taken-out inverter G with respect to the hollow portion 84 formed with respect to the supporting member 82 of the assembler 74. The center portion in the longitudinal direction of the inverter G is supported by the supporting member 82. Therefore, both ends of the inverter G are lifted from the auxiliary workbench 34.

(Step S2-3)

The double-armed robot 20 uses the first suction pad 47a of the first hand 45a to take out the second buffer material B from the second gravity conveyor 32. Along therewith, the double-armed robot 20 uses the second suction pad 47b of the second hand 45b to suck the buffer material B which is temporarily placed on the temporary placer 72 in step S2-2. Each buffer material B is placed between the guiding members 80 provided to the assembler 74 of the auxiliary workbench 34 so that each hole portion 70 is directed toward the inverter G. The buffer material B sucked by the first suction pad 47a is placed on the left side of the inverter G as seen from the double-armed robot 20. The buffer material B sucked by the second suction pad 47b is placed on the right side of the inverter G as seen from the double-armed robot 20.

(Step S2-4)

The double-armed robot 20 uses the first pad 48a and the second pad 48b to push the buffer materials B located on the left and right of the inverter G from the outside toward the inverter G. The buffer materials B are guided by the pair of guiding members 80 so as to be slid on the auxiliary workbench 34, and are moved toward the inverter G. As described above, both ends of the inverter G are lifted from the auxiliary workbench 34, and is located at a height corresponding to the hole portions 70 formed with respect to the buffer materials B, so that the hole portions 70 are fitted to both ends of the inverter G, and the buffer materials B are attached to the inverter G.

(Step S3-1)

Subsequently, the double-armed robot 20 pushes and holds the buffer materials B onto the inverter G, and lifts the inverter G together with the buffer materials B.

The double-armed robot 20 is turned about 90° to the right, and is opposite the empty corrugated box C on the workbench 24.

It is assumed that the flaps F11, F12, F21, and F22 are erected, and the double-armed robot 20 moves the held buffer materials B and inverter G upward of the opening of the corrugated box C with the trajectory which prevents the interference with the inside-inclined flap or with the trajectory which at least prevents the flaps F11, F12, F21, and F22 from being inclined to the inside.

The double-arm robot 20 lowers the first hand 45a and the second hand 45b to the height (an opening height H shown in FIG. 3) in which they are not brought into contact with the side surface on the upstream side and the side surface on the downstream side of the corrugated box C, respectively. Thereafter, the double-armed robot 20 releases the buffer materials B held above the opening of the corrugated box C, and slides the inverter G into the corrugated box C together with the buffer materials B.

The double-armed robot 20 pulls up the first hand 45a and the second hand 45b from the position in which the buffer materials B are released, and lowers the distal ends of the first hand 45a and the second hand 45b from above the corrugated box C to the opening of the corrugated box C. Thereby, when the buffer materials B are jumped out upward from the opening, the jumped-out buffer materials B are pushed into the corrugated box C, and the inverter G and the buffer materials B can be reliably packed into the corrugated box C.

The double-armed robot 20 uses the first hand 45a and the second hand 45b again to fold the outer flap F21 on the front side and the outer flap F22 on the rear side to the outside. Thereby, the outer flap F21 on the front side and the outer flap F22 on the rear side are folded firmly.

The double-armed robot 20 uses the first pad 48a and the second pad 48b again to fold the inner flap F11 on the downstream side and the inner flap F12 on the upstream side to the outside. Thereby, the inner flap F11 on the downstream side and the inner flap F12 on the upstream side are folded firmly.

(Step S3-2)

The double-armed robot 20 is turned about 90° to the right.

The double-armed robot 20 uses the first suction pad 47a and the second suction pad 47b to suck the software CD 86 and the manual 87 placed on the accessory supply table 36.

The double-armed robot 20 lifts the software CD 86 and the manual 87, is turned about 90° to the left, and is opposite the corrugated box C into which the inverter G on the workbench 24 is packed.

The double-armed robot 20 sequentially packs the sucked manual 87 and software CD 86 into the corrugated box C, respectively. In that case, it is assumed that the flaps F11, F12, F21, and F22 are inclined to the inside, and the double-armed robot 20 packs the sucked manual 87 and software CD 86 into the corrugated box C with the trajectory which prevents the interference with the inside-inclined flap.

(Step S3-3)

The double-armed robot 20 packs the manual 87, operates the second arm 42b without being turned, and sucks the intermediate sheet 88 on the accessory supply table 36 by the second suction pad 47b. The double-armed robot 20 moves the sucked intermediate sheet 88, and closes the opening of the corrugated box C on the workbench 24.

The double-armed robot 20 uses the first pad 48a and the second pad 48b to fold the inner flap F11 on the downstream side and the inner flap F12 on the upstream side to the inside.

(Step S4-1)

The pair of holding members 62 of the workbench 24 release the corrugated box C.

The double-armed robot 20 uses the first pad 48a to push the side surface on the upstream side of the corrugated box C in the direction of the conveying-out conveyor 26. As described above, since the workbench 24 is installed so as to be located at substantially the same height as the conveying surface of the conveying-out conveyor 26, when the double-armed robot 20 uses the first hand 45a to push the corrugated box C, the corrugated box C is moved from the workbench 24 to the conveying-out conveyor 26. In this way, since in the packing system 10, the double-armed robot 20 itself moves the corrugated box C, any different mechanism for moving the corrugated box C from the workbench 24 to the conveying-out conveyor 26 at the timing according to the operation of the double-armed robot 20 is not necessary.

Hereinafter, when steps S1 to S4 are repeated, the inverter G is sequentially packed into the corrugated box C.

Further, the series of operations may be performed at the same time, if possible, without being performed sequentially.

Subsequently, a second embodiment will be described. In this embodiment, the configuration of the first embodiment is partially changed, the description of the same configuration as the first embodiment is omitted, and the same reference numerals are used.

An assembling system 110 according to the second embodiment is an example of a processing system, and is a system which performs, as an operation, an assembling operation of assembling a plurality kinds of components W1 and W2 to a base material W which is an object to be processed.

Figure 10:
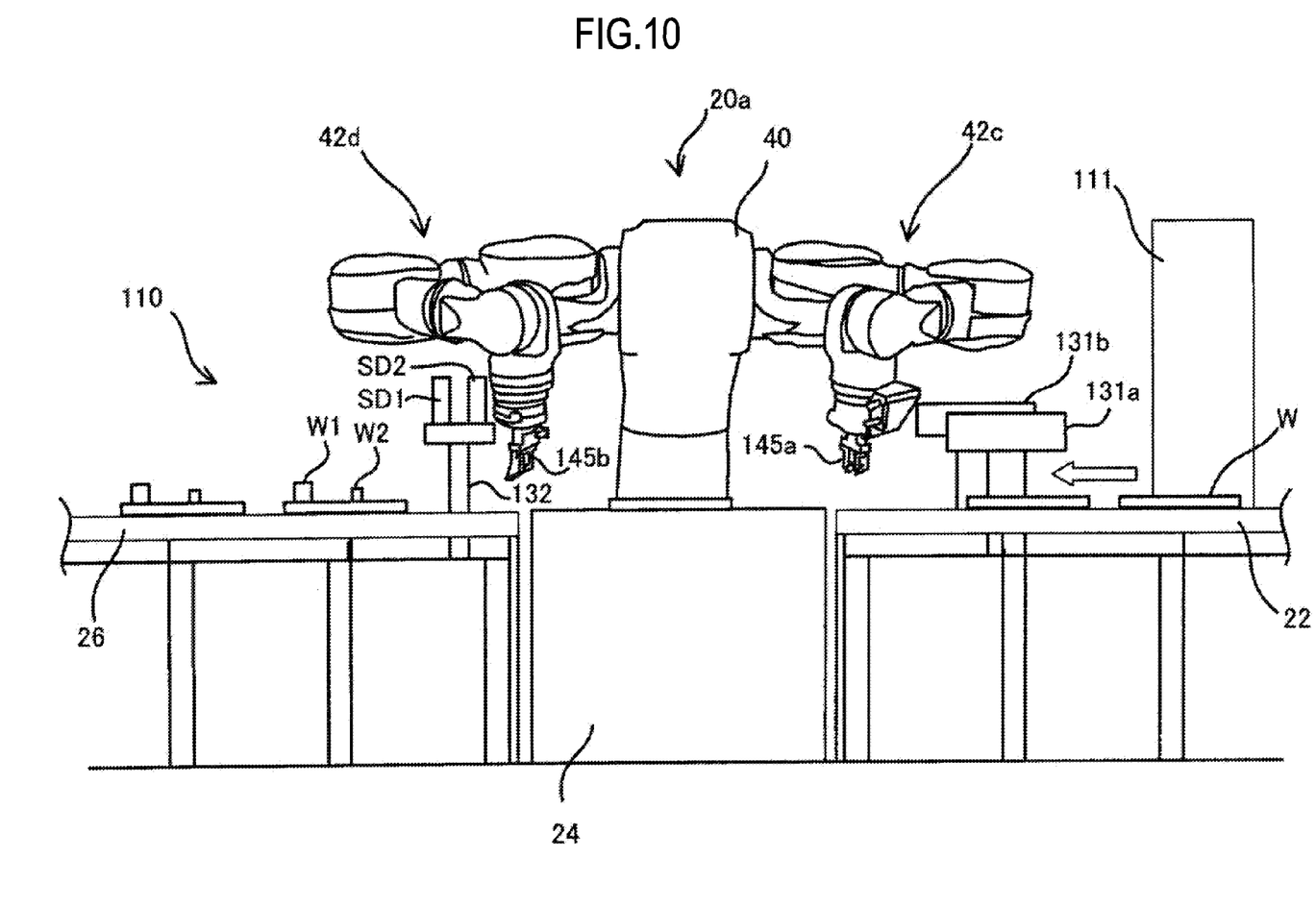
FIG. 10 is a front side view of a packing system according to a second embodiment.

As shown in FIG. 10, the assembling system 110 includes a double-armed robot 20a, the conveying-in conveyor 22, the workbench 24, and the conveying-out conveyor 26.

A first arm 42c and a second arm 42d of the double-armed robot are provided with a firsthand 145a and a secondhand 145b including holding mechanisms which hold the components W1 and W2 and tools SD1 and SD2 for the assembling operation, respectively.

In addition, the assembling system 110 is provided with, as an example of an article supplier, work suppliers 131a and 131b which accommodate the components W1 and W2, respectively, and a tool stand 132 on which, e.g., the two tools SD1 and SD2 are placed, near (within the operating range) of the double-armed robot 20a.

The operation of the assembling system 110 is controlled by a system controller 111 as a host controller having a storage device, an arithmetic device, a display device, and an input device.

The assembling system 110 according to the second embodiment is configured in this manner, and is operated as follows to perform the assembling operation (processing operation).

The base material W sequentially conveyed in the arrow direction shown in FIG. 10 by the conveying-in conveyor 22 is brought into contact with the stopper 52 advanced from the conveying surface, and is stopped at the end on the downstream side. Thereafter, the stopper 52 is retreated to release the regulation of the base material W.

Then, the double-armed robot 20a operates the second arm 42d, abuts the second hand 145b onto the end on the upstream side of the base material W stopped in the downmost stream side of the conveying-in conveyor 22, and slidably moves the base material W to the workbench 24. Then, the double-armed robot 20a pushes the base material W onto a positioning jig (not shown) on the workbench 24 to position the base material W. At this time, the stopper 52 of the conveying-in conveyor 22 is advanced again to stop the following base material W.

In addition, the first arm. 42c is operated along with the operation of the second arm 42d to hold the component W1 of the work supplier 131a by the first hand 145a.

Then, the first arm 42c (the first hand 145a) is operated so that the double-armed robot 20a arranges the component W1 in the previously instructed position of the base material W on the workbench 24 and temporarily support the component W1.

In addition, the second arm 42d is operated along therewith so that the tool SD1 which is placed on the tool stand 132 and assembles the component W1 is held by the second hand 145b. Then, the component W1 temporarily supported by the first hand 145a is completely assembled to the base material W by operating the tool SD1.

Thereafter, the second arm 42d is operated to return the tool SD1 to the tool stand 132 so that the tool SD2 is held by the secondhand 145b. Then, along therewith, the first arm 42c is operated to hold the component W2 of the work supplier 131b by the first hand 145a.

Then, the first arm 42c is operated to arrange and temporarily support the component W2 in the previously instructed position of the base material W on the workbench 24. The component W2 temporarily supported by the first hand 145a is completely assembled to the base material W by operating the tool SD2.

When the assembling processing of the components W1 and W2 is completed, the second arm 42d is operated to return the tool SD2 to the tool stand 132. In addition, along therewith, the first arm 42c is operated to push the end on the upstream side of the base material W to which the components W1 and W2 are assembled, by the first hand 145a, so that the base material W is slidably moved from the workbench 24 to the conveying-out conveyor 26.

Thereafter, the assembling processing is repeatedly executed to the following base material W on the conveying-in conveyor 22.

Further, the system controller 111 is programmed so as to retry the operation which causes a failure in the double-armed robot 20a when the double-armed robot 20a fails to hold the components W1 and W2 and when an assembling failure occurs.

In this embodiment, even when the timing for the processing operation by the double-armed robot 20a is shifted, the double-armed robot 20a itself conveys the base material W to or from the workbench 24. Therefore, any different mechanism which is synchronized with the processing operation timing of the double-armed robot 20a is not required to be provided on the conveying-in conveyor 22 and the conveying-out conveyor 26. In addition, since the conveying-in conveyor 22, the workbench 24, and the conveying-out conveyor 26 have substantially the same height position, the base material W can be conveyed only by being slid, so that any mechanism for holding the base material W is not required to be provided on the hands 145a and 145b of the double-armed robot 20a. Further, low friction processing and rollers are provided to the upper surfaces of the conveying-in conveyor 22, the workbench 24, and the conveying-out conveyor 26, so that the assembling operation can be automated without using any robots having a large output even when the weight of the base material W is large.

As another example of the processing system, there is given a substrate assembling system in which a robot mounts an electronic component supplied from the article supplier on a printed-circuit board conveyed by the first conveyor.

The present invention is not limited to the above embodiments, and modifications can be made in the scope without changing the purport of the present invention. For instance, the above embodiments and modification examples are combined in part or in whole to configure the invention, which is included in the technical scope of the present invention.

The packing case according to the first embodiment is not limited to the corrugated box having flaps, and may be a corrugated box without any flaps. In that case, the operation of the robot to the flaps can be omitted. Further, the packing case may be a case manufactured of a resin material.

The processing operation according to the second embodiment also includes a disassembling operation of disassembling the assembled product (the object to be processed) using the tool. Then, of the disassembled components, those useful for recycling may be conveyed to the second conveyor.

Further, although the system controller is shown as one independent apparatus for ease of description in the above embodiments, a controller which controls the robot and a controller which controls the operation of other mechanism may be combined to configure the entire combination as the system controller.

What is claimed as new and desired to be secured by Letters Patent of the United States is:

1. A processing system comprising:
   an article supplier which supplies an article;
   a first conveyor which conveys an object to be processed;
   a workbench which is provided on the downstream side of the first conveyor and places thereon the object to be processed, conveyed by the first conveyor;
   a robot which takes out the article from the article supplier and subjects the object to be processed, placed on the workbench, to an operation using the article according to a previously instructed operation movement; and
   a second conveyor which is provided on the downstream side of the workbench and conveys the object to be processed, which has been subjected to the operation by the robot,
   wherein the article supplier is a first gravity conveyor in which the downstream side is lower than the upstream side and the conveying surface is inclined, and
   wherein before taking out the article from the first gravity conveyor, the robot pushes the article toward the upstream side.

2. The processing system according to claim 1, wherein the object to be processed is a packing case,
   wherein the robot subjects the packing case to an operation of packing the article.

3. The processing system according to claim 2, wherein the robot conveys the packing case conveyed by the first conveyor to the workbench to pack the article into the packing case, and conveys the packing case from the workbench to the second conveyor.

4. The processing system according to claim 3, wherein the packing case is a corrugated box having a flap in an opening,
   wherein the robot moves an arm of the robot with the trajectory which prevents the interference with the inside-inclined flap.

5. The processing system according to claim 1, wherein the robot is a double-armed robot having first and second arms.

6. The processing system according to claim 5, wherein the first and second arms have first and second contacting members which are brought into contact with the packing case, respectively, and have first and second suction pads which suck the buffer material.

7. The processing system according to claim 6, wherein the double-armed robot executes an operation of folding the flap to the outside of the opening by the first and second contacting members at a predetermined timing.

8. A processing system comprising:
   an article supplier which supplies an article;
   a first conveyor which conveys an object to be processed;
   a workbench which is provided on the downstream side of the first conveyor and places thereon the object to be processed, conveyed by the first conveyor;
   a robot which takes out the article from the article supplier and subjects the object to be processed, placed on the workbench, to an operation using the article according to a previously instructed operation movement;
   a second conveyor which is provided on the downstream side of the workbench and conveys the object to be processed, which has been subjected to the operation by the robot; and
   a buffer material supplier which supplies a buffer material inserted into a space caused between the article and the packing case.

9. The processing system according to claim 8, wherein the buffer material supplier is a second gravity conveyor in which the downstream side is lower than the upstream side and the conveying surface is inclined,
   wherein the robot holds the buffer material on the downmost stream side from the second gravity conveyor and pushes the buffer material to the upstream side once to lift the buffer material.

10. The processing system according to claim 9, wherein a weight is placed on the upstream side of the buffer material of the second gravity conveyor.

11. The processing system according to claim 10, wherein the weight is a metal plate and the buffer material is placed on the metal plate.

12. A processing system comprising:
    means for supplying an article to a robot;
    means for supplying an object to be processed, to a workbench; and
    a robot which subjects the object to be processed, placed on the workbench to an operation using the article according to a previously instructed operation movement,
    wherein the means for supplying is a first gravity conveyor in which the downstream side is lower than the upstream side and the conveying surface is inclined, and
    wherein before taking out the article from the first gravity conveyor, the robot pushes the article toward the upstream side.

13. A product manufacturing method comprising:
    supplying an article using an article supplier;
    conveying an object to be processed, by a first conveyor to a workbench;
    allowing a robot to place the object to be processed, conveyed to the front of the workbench, on the workbench according to a previously instructed operation;
    allowing the robot to subject the object to be processed, placed on the workbench, to an operation using the article; and
    allowing the robot to convey the object to be processed which has been subjected to the operation to the outside,
    wherein the article supplier is a first gravity conveyor in which the downstream side is lower than the upstream side and the conveying surface is inclined, and
    wherein before taking out the article from the first gravity conveyor, the robot pushes the article toward the upstream side.

* * * * *